United States Patent
Takabayashi

(10) Patent No.: US 11,210,077 B2
(45) Date of Patent: Dec. 28, 2021

(54) AVAILABLE SYSTEM, AND METHOD AND PROGRAM-RECORDING MEDIUM THEREOF

(71) Applicant: Yokogawa Electric Corporation, Tokyo (JP)

(72) Inventor: Yuji Takabayashi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 231 days.

(21) Appl. No.: 16/550,287

(22) Filed: Aug. 26, 2019

(65) Prior Publication Data

US 2020/0073647 A1    Mar. 5, 2020

(30) Foreign Application Priority Data

Aug. 31, 2018  (JP) .............................. JP2018-163641

(51) Int. Cl.
| | |
|---|---|
| *G06F 9/455* | (2018.01) |
| *G06F 8/61* | (2018.01) |
| *G06F 9/48* | (2006.01) |
| *G06F 11/16* | (2006.01) |
| *G06F 11/14* | (2006.01) |
| *G06F 9/46* | (2006.01) |

(52) U.S. Cl.
CPC ............ *G06F 8/63* (2013.01); *G06F 9/45558* (2013.01); *G06F 9/461* (2013.01); *G06F 9/4856* (2013.01); *G06F 11/1484* (2013.01); *G06F 11/1662* (2013.01); *G06F 2009/4557* (2013.01); *G06F 2009/45562* (2013.01); *G06F 2009/45575* (2013.01); *G06F 2009/45595* (2013.01)

(58) Field of Classification Search
CPC ........ G06F 8/63; G06F 9/461; G06F 11/1484; G06F 11/1662; G06F 9/45558; G06F 9/4856; G06F 2009/4557; G06F 2009/45575; G06F 2009/45595; G06F 2009/45562
See application file for complete search history.

(56) References Cited

U.S. PATENT DOCUMENTS

| | | | |
|---|---|---|---|
| 2006/0155912 A1* | 7/2006 | Singh .................. | G06F 11/2028 711/6 |
| 2011/0208908 A1* | 8/2011 | Chou .................. | G06F 11/2038 711/112 |

(Continued)

FOREIGN PATENT DOCUMENTS

JP             H113240 A        1/1999

*Primary Examiner* — Dong U Kim

(57) ABSTRACT

Availability against hardware failure and availability against maintenance are implemented without using dedicated systems. A system is provided, including: a first host computer to execute a first virtual machine for running a first application; and a second host computer to execute a second virtual machine for running a second application, wherein in a redundant operation mode, the second host computer mirrors an executable image of the first virtual machine to an executable image of the second virtual machine while stopping the execution of the second virtual machine, and in a multi-operation mode, the second host computer mirrors an internal state of the first application to an internal state of the second application while executing the second virtual machine in parallel with the first virtual machine.

11 Claims, 6 Drawing Sheets

(56) References Cited

U.S. PATENT DOCUMENTS

| | | | |
|---|---|---|---|
| 2011/0314155 A1* | 12/2011 | Narayanaswamy | G06F 9/4856 709/226 |
| 2013/0191831 A1* | 7/2013 | Goyal | G06F 11/1484 718/100 |
| 2013/0212205 A1* | 8/2013 | Flockhart | H04L 69/40 709/208 |
| 2014/0149354 A1* | 5/2014 | Chan | G06F 11/2038 707/639 |
| 2015/0074447 A1* | 3/2015 | Park | G06F 9/45558 714/4.11 |

\* cited by examiner

AVAILABLE SYSTEM, AND METHOD AND PROGRAM-RECORDING MEDIUM THEREOF

The contents of the following Japanese patent application(s) are incorporated herein by reference:
2018-163641 filed in JP on Aug. 31, 2018

1. TECHNICAL FIELD

The present invention relates to an available system, and a method and program-recording medium thereof.

2. RELATED ART

Conventionally, in systems that require the ability for continuous operation (availability), redundant systems and multi-server configuration systems have been used in order to deal with the risk of unscheduled service outage due to hardware failure. A computer system for duplex control that can modify system programs without affecting the controlled objects is also known (see Patent Document 1, for example).
Patent Document 1: Japanese Patent Application Publication No. H11-003240

SUMMARY

Conventional techniques use dedicated hardware and dedicated operating systems (OS) that are highly customized, to implement continuous services without suspending the system even during scheduled maintenance work such as a software update operation. However, it is desired to implement availability against hardware failure and availability against maintenance without using dedicated systems.

To solve the above-described issues, a first aspect of the present invention provides a system. The system may include a first host computer to execute a first virtual machine for running a first application. The system may include a second host computer to execute a second virtual machine for running a second application. In a redundant operation mode, the second host computer may mirror an executable image of the first virtual machine to an executable image of the second virtual machine while stopping the execution of the second virtual machine. In a multi-operation mode, the second host computer may mirror an internal state of the first application to an internal state of the second application while executing the second virtual machine in parallel with the first virtual machine.

In the redundant operation mode, the second host computer may copy the executable image of the first virtual machine, and mirrors the copied executable image of the first virtual machine to the executable image of the second virtual machine.

The first host computer may execute a first platform comprising a virtualized environment in which to execute the first virtual machine. The second host computer may execute a second platform comprising a virtualized environment in which to execute the second virtual machine. In the redundant operation mode, the second host computer may mirror the executable image of the first virtual machine to the executable image of the second virtual machine on the second platform.

In the multi-operation mode, the second host computer may mirror the internal state of the first application to the internal state of the second application on the second application.

In the multi-operation mode, the second host computer may mirror the internal state of the first application to the internal state of the second application on the second platform.

The first host computer may save a context of the first application from the first application to the first platform, and transfer the context of the first application from the first platform to the second platform. The second host computer may restore the transferred context of the first application from the second platform to the second application.

In the redundant operation mode, in response to an abnormality in execution of the first application occurring while the second application is set as a standby of the first application, the second host computer may start executing the second virtual machine using the mirrored executable image of the first virtual machine.

In the redundant operation mode, in response to receiving an instruction to update software running on at least one of the first virtual machine and the second virtual machine while the second application is set as a standby of the first application, the second host computer may update software running on the second virtual machine. After updating the software, the second host computer may transition to the multi-operation mode, and mirror the internal state of the first application to the internal state of the second application.

After the second host computer mirrors the internal state of the first application to the internal state of the second application, in the redundant operation mode, the first host computer may set the first application as a standby of the second application, and mirror the executable image of the second virtual machine to the executable image of the first virtual machine.

In the redundant operation mode, only one of an operating system executing the first application on the first virtual machine and an operating system executing the second application on the second virtual machine may be assigned a network configuration that is externally accessible, and in the multi-operation mode, the operating system executing the first application on the first virtual machine and the operating system executing the second application on the second virtual machine may be assigned respective, different network configurations that are externally accessible.

A second aspect of the present invention provides a method. In a system comprising a first host computer to execute a first virtual machine for running a first application and a second host computer to execute a second virtual machine for running a second application, the method may include, in a redundant operation mode, the second host computer mirroring an executable image of the first virtual machine to an executable image of the second virtual machine while stopping the execution of the second virtual machine. The method may include, in a multi-operation mode, the second host computer mirroring an internal state of the first application to an internal state of the second application while executing the second virtual machine in parallel with the first virtual machine.

A third aspect of the present invention provides a program-recording medium. In a system comprising a first host computer to execute a first virtual machine for running a first application and a second host computer to execute a second virtual machine for running a second application, the program may be executed by the second host computer. The program may cause the second host computer to, in a redundant operation mode, mirror an executable image of the first virtual machine to an executable image of the second virtual machine while stopping the execution of the second virtual machine. The program may cause the second host computer to, in a multi-operation mode, mirror an internal state of the first application to an internal state of the second application while executing the second virtual machine in parallel with the first virtual machine.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
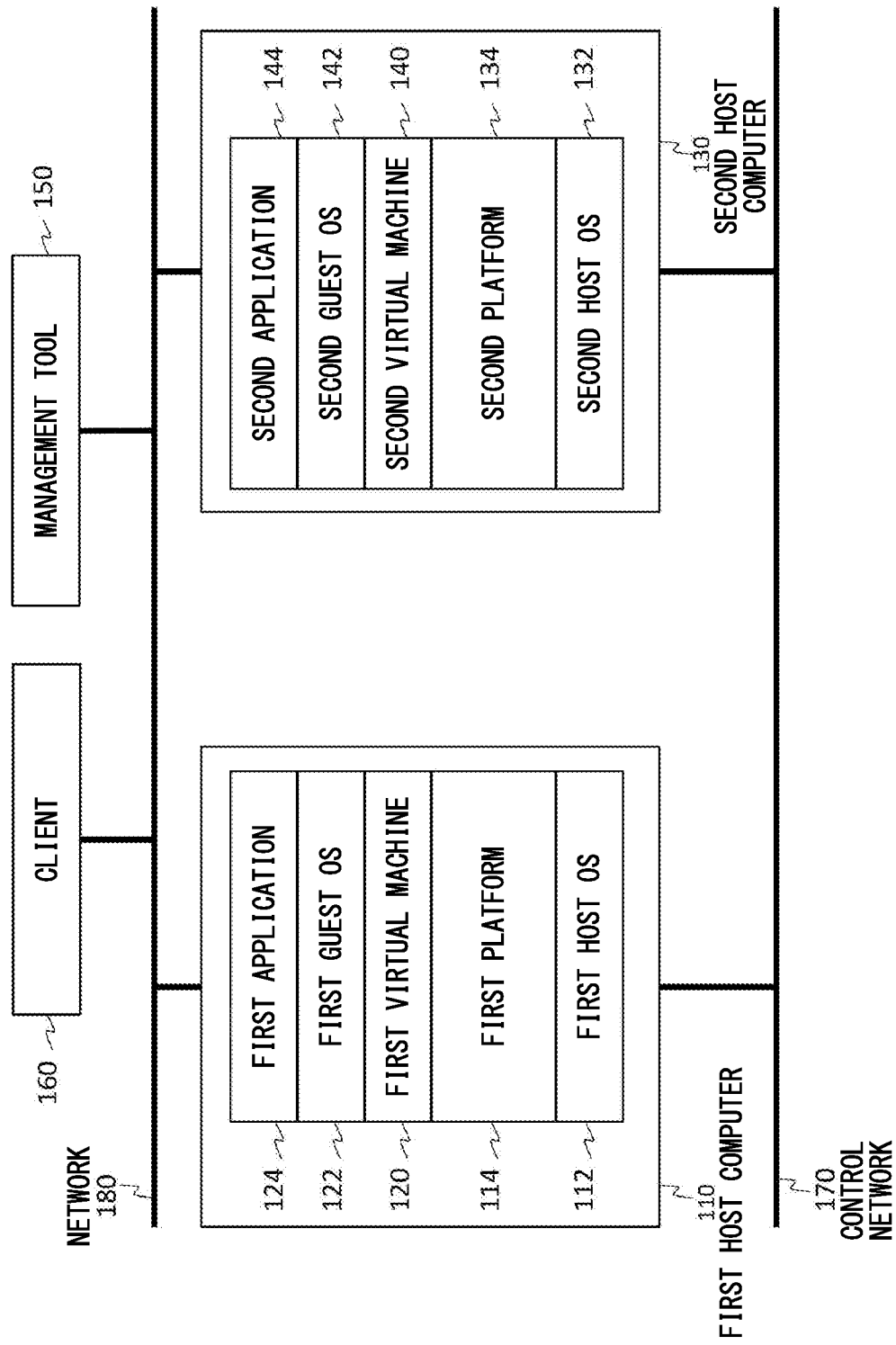
FIG. 1 shows a system 10 according to an embodiment of the present invention.

FIG. 1 shows a system 10 according to an embodiment of the present invention. The system 10 according to the present embodiment uses a first host computer 110 and a second host computer 130 to provide continuous services to a client 160, without suspending the system even in hardware failure and maintenance work, under control of a management tool 150. The system 10 according to the present embodiment is applicable to a variety of systems such as, for example, Supervisory Control And Data Acquisition (SCADA) systems, plant information management systems, Distributed Control Systems (DC S), communication gateway systems (such as OLE for Process Control (OPC) servers), and operational efficiency improvement systems in process control systems. As an example, if the system 10 according to the present embodiment is applied to a process control system, continuous process control and monitoring can be implemented by utilizing the first host computer 110 and the second host computer 130 of the system 10 according to the present embodiment e.g. to construct a monitoring and control station that collects various process data and sends commands to the process, to provide availability. In this manner, for example, the monitoring and control station can provide various services to the client 160 without suspending the system even during server failure or maintenance. The system 10 includes the first host computer 110, the second host computer 130, the management tool 150, the client 160, a control network 170, and a network 180. Note that this figure shows an example in which there are two host computers. However, the number of host computers is not limited to two, and may be three or more. Also, in the example of this figure, the control network 170 and the network 180 are independently provided. However, the control network 170 and the network 180 may be integrated.

The first host computer 110 may be a computer such as a PC (personal computer), a tablet computer, a smartphone, a workstation, a server computer, or a general-purpose computer, or may be a computer system to which a plurality of computers are connected. The first host computer 110 executes a first host operating system 112 installed on the first host computer 110, and executes a first platform 114 on the first host operating system 112. The first host computer 110 then executes a first virtual machine 120 with a virtualization function of the first platform 114, and executes a first guest operating system 122 and a first application 124 on the first virtual machine 120.

The first host operating system 112 is an operating system installed on the first host computer 110, and can serve as a platform on which a virtualized environment runs.

The first platform 114 is executed on the first host operating system 112 in the first host computer 110, and includes a virtualized environment in which to execute a virtual machine. The first platform 114 is implemented by general-purpose platform software that is independent of the first guest operating system 122 and the first application 124. In the present embodiment, the first platform 114 has virtualization management functions and redundancy management functions.

The first platform 114 has a virtualization function to provide a virtual hardware environment to the first guest operating system 122, as a virtualization management function.

The first platform 114 has an equalization function to maintain the same virtualized environment between guest operating systems of host computers, as a redundancy management function. The first platform 114 also has a state management function to manage operational states of the first host computer 110, as a redundancy management function. The first platform 114 also has a state switching function to switch between operational states of the first host computer 110, as a redundancy management function. The first platform 114 also has a configuration function to configure the operating environment of the first guest operating system 122 by performing network configurations (such as an IP address configuration and a routing configuration) of the first guest operating system 122 in response to a configuration request from the management tool 150, as a redundancy management function. The first platform 114 also has an application OF function to interface with the first application 124, as a redundancy management function. Note that the first platform 114 may use a Dynamic Host Configuration Protocol (DHCP) function, for example, to configure the operating environment of the first guest operating system 122. For example, the first platform 114 can configure the operating environment of the first guest operating system 122 by performing the network configuration of the first guest operating system 122 environment with a DHCP server function of the first host operating system 112 side and acquiring configured values with a DHCP client function of the first guest operating system 122 environment.

The first virtual machine 120 is a virtual machine executed on the first host computer 110 with the virtualization function of the first platform 114, and runs the first guest operating system 122 and the first application 124 thereon.

The first guest operating system 122 is an operating system executed on the first virtual machine 120. The first application 124 is a program executed on the first guest operating system. The first application 124 provides various services, corresponding to a variety of systems, to the client 160 in response to requests from the client 160.

The second host computer 130 is similar to the first host computer 110, and executes a second host operating system 132 installed on the second host computer 130 and executes a second platform 134 on the second host operating system 132. The second host computer 130 then executes a second virtual machine 140 with a virtualization function of the second platform 134, and executes a second guest operating system 142 and a second application 144 on the second virtual machine 140.

The second host operating system 132, the second platform 134, the second virtual machine 140, the second guest operating system 142, and the second application 144 are similar to the first host operating system 112, the first platform 114, the first virtual machine 120, the first guest operating system 122, and the first application 124, respectively, and will not be repeatedly described herein.

The management tool 150 is connected to the first host computer 110 and the second host computer 130 via the network 180. The management tool 150 has a configuration function to perform configurations of the first host operating system 112, the second host operating system 132, the first guest operating system 122, and the second guest operating system 142, and has an instruction function to instruct operational states of the first host computer 110 and the second host computer 130. The management tool 150 also has a state monitoring function to display and monitor operational states of the first host computer 110 and the second host computer 130.

The client 160 may be a human interface station (HIS) with a human-machine interface, for example. The client 160 is connected to the first host computer 110 and the second host computer 130 via the network 180. The client 160 accesses a virtual IP address assigned to a guest operating system executed on a host computer in an active state, which will be described later, and communicates with the guest operating system executed on the host computer in the active state, to receive the provision of various services.

The control network 170 connects the first host computer 110 and the second host computer 130, and transfers control information between the host computers.

The network 180 connects the first host computer 110, the second host computer 130, the management tool 150, and the client 160 with each other. The network 180 may be Ethernet (registered trademark), for example.

Figure 2:
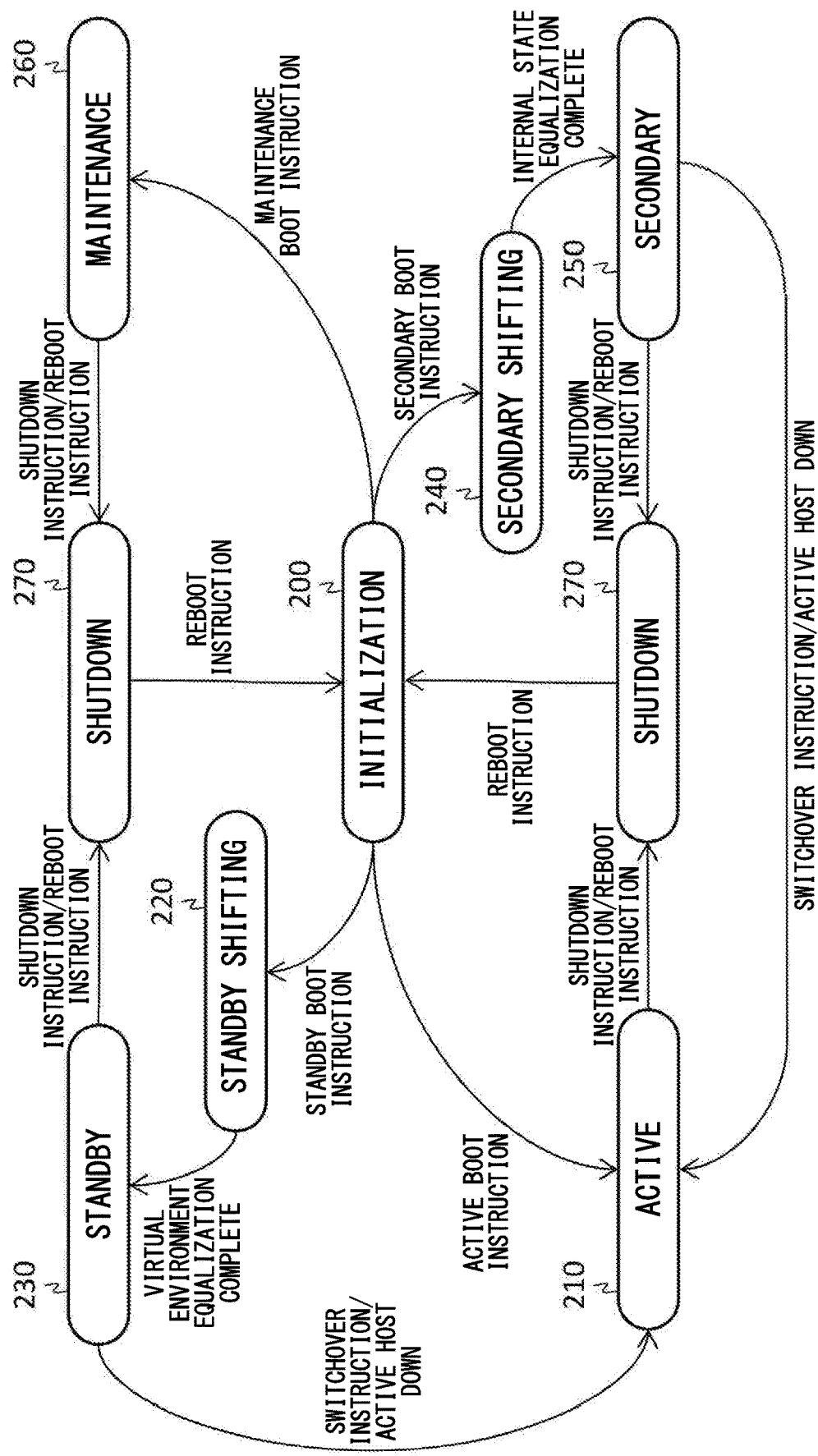
FIG. 2 shows transitions between operational states of a first host computer 110 and a second host computer 130 according to the present embodiment.

FIG. 2 shows transitions between operational states of the first host computer 110 and the second host computer 130 according to the present embodiment. The first host computer 110 and the second host computer 130 are similar in terms of their transitions between operational states, and this figure only illustrates the transitions between operational states of the first host computer 110 by way of example. The first host computer 110 transitions between the following operational states: an initialization state 200; an active state 210; a standby shifting state 220; a standby state 230; a secondary shifting state 240; a secondary state 250; a maintenance state 260; and a shutdown state 270.

When powered on, the first host computer 110 boots in the initialization state 200. In the initialization state 200, the first host computer 110 initializes its network configuration.

When receiving an active boot instruction in the initialization state 200, the first host computer 110 transitions to the active state 210. After transitioning to the active state 210, the first host computer 110 provides various services to the client 160 using the first application 124 executed thereon.

When receiving a standby boot instruction in the initialization state 200, the first host computer 110 transitions to the standby shifting state 220. After transitioning to the standby shifting state 220, the first host computer 110 performs equalization of executable images of virtual machines with respect to another host computer that is in the active state 210. This will be described later.

When completing the equalization of executable images of virtual machines in the standby shifting state 220, the first host computer 110 transitions to the standby state 230. After transitioning to the standby state 230, the first host computer 110 continues only the equalization of executable images of virtual machines with respect to the other host computer in the active state 210, and stops other operations in the virtual environment. The first host computer 110 then sets the first application 124 executed thereon as a standby of an application executed on the other host computer in the active state 210. While in the standby state 230, the first host computer 110 diagnoses the health of the other host computer in the active state 210. Note that a host computer in the standby state 230 is not recognized by the client 160.

A redundant operation mode is defined herein as a mode in which one host computer operates in the active state 210 and another host computer operates in the standby shifting state 220 or the standby state 230. During normal operation, the system 10 according to the present embodiment provides various services to the client 160 in the redundant operation mode in which one host computer operates in the active state 210 and another host computer operates in the standby state 230. That is, for example, when the first host computer 110 operates in the active state 210 and the second host computer 130 operates in the standby state 230, the system 10 provides various services to the client 160 from the first application 124 while the second application 144 is set as a standby of the first application 124. Alternatively, the second host computer 130 may operate in the active state 210 and the first host computer 110 may operate in the standby state 230. In this case, the system 10 provides various services to the client 160 from the second application 144 while the first application 124 is set as a standby of the second application 144. In the redundant operation mode, only one of the first guest operating system 122 executing the first application 124 on the first virtual machine 120 and the second guest operating system 142 executing the second application 144 on the second virtual machine 140 may be assigned a network configuration that is externally accessible. That is, in the redundant operation mode, although there are a plurality of hardware components serving as host computers, the client 160 may recognize as if there was a single apparatus serving as a host computer (with a single address, host name, and the like), not recognizing the host computer in the standby state. If both the host computer in the active state 210 and the host computer in the standby state 230 are rebooted in the redundant operation mode, a negotiation is performed between them after the reboot to determine the boot mode. In this case, the one that was previously in the active state 210 may be put in the active state 210 and the other may be put in the standby state 230, for example.

When receiving a secondary boot instruction in the initialization state 200, the first host computer 110 transitions to the secondary shifting state 240. After transitioning to the secondary shifting state 240, the first host computer 110 performs equalization of internal states of applications with respect to another host computer that is in the active state 210.

When completing the equalization of internal states of applications in the secondary shifting state 240, the first host computer 110 notifies the first platform 114 of the completion of the equalization of internal states of applications, and transitions to the secondary state 250. After the first host computer 110 transitions to the secondary state 250, the first guest operating system 122 is assigned a virtual IP address different from that of the guest operating system of the other host computer in the active state 210, and the first host computer 110 executes the first guest operating system 122 and the first application 124 as a secondary system that is independent of the other host computer in the active state 210. While in the secondary state 250, the first host computer 110 diagnoses the health of the other host computer in the active state 210, similar to the standby state 230.

A multi-operation mode is defined herein as a mode in which one host computer operates in the active state 210 and another host computer operates in the secondary shifting state 240 or the secondary state 250. When a software update occurs, the system 10 according to the present embodiment provides various services to the client 160 in the multi-operation mode in which one host computer operates in the active state 210 and another host computer operates in the secondary state 250. That is, for example, when the first host computer 110 operates in the active state 210 and the second host computer 130 operates in the secondary state 250, the system 10 provides various services to the client 160 from the first application 124 while executing the first application 124 and the second application 144 independently of each other. Alternatively, the second host computer 130 may operate in the active state 210 and the first host computer 110 may operate in the secondary state 250. In this case, the system 10 provides various services to the client 160 from the second application 144 while executing the first application 124 and the second application 144 independently of each other. In the multi-operation mode, the first guest operating system 122 executing the first application 124 on the first virtual machine 120 and the second guest operating system 142 executing the second application 144 on the second virtual machine 140 may be assigned respective, different network configurations that are externally accessible. That is, in the multi-operation mode, the client 160 may recognize that a plurality of hardware components serving as host computers have independent attributes (different addresses and host names). Also, in the multi-operation mode, since the host computer in the active state 210 and the host computer in the secondary state 250 operate independently, the respective guest operating systems and applications running thereon may be of different revisions.

When receiving, in the standby state 230 or the secondary state 250, a switchover instruction or detecting that the other host computer in the active state 210 is down, the first host computer 110 transitions to the active state 210. The term "switchover" refers to a process of rebooting the host computer in the active state 210 and switching the host computer in the standby state 230 or secondary state 250 to the active state 210.

When receiving a maintenance boot instruction in the initialization state 200, the first host computer 110 transitions to the maintenance state 260. After transitioning to the maintenance state 260, the first host computer 110 updates software running on the first virtual machine 120, such as the first guest operating system 122 and the first application 124. Typically, when a guest operating system is booted, an application also boots regardless of the host computer's state. In that case, if one is in the active state 210 and the other is in the maintenance state 260, two applications will run simultaneously and processes will overlap. Thus, it is preferable to disconnect the guest operating system from the network 180 in the maintenance state 260, for example, so that the application running on the host computer in the maintenance state 260 does not affect the client 160.

When receiving a shutdown instruction in the active state 210, the standby state 230, the secondary state 250, or the maintenance state 260, the first host computer 110 transitions to the shutdown state 270. When receiving a reboot instruction in the active state 210, the standby state 230, the secondary state 250, or the maintenance state 260, the first host computer 110 passes through the shutdown state 270 and transitions to the initialization state 200.

Figure 3:
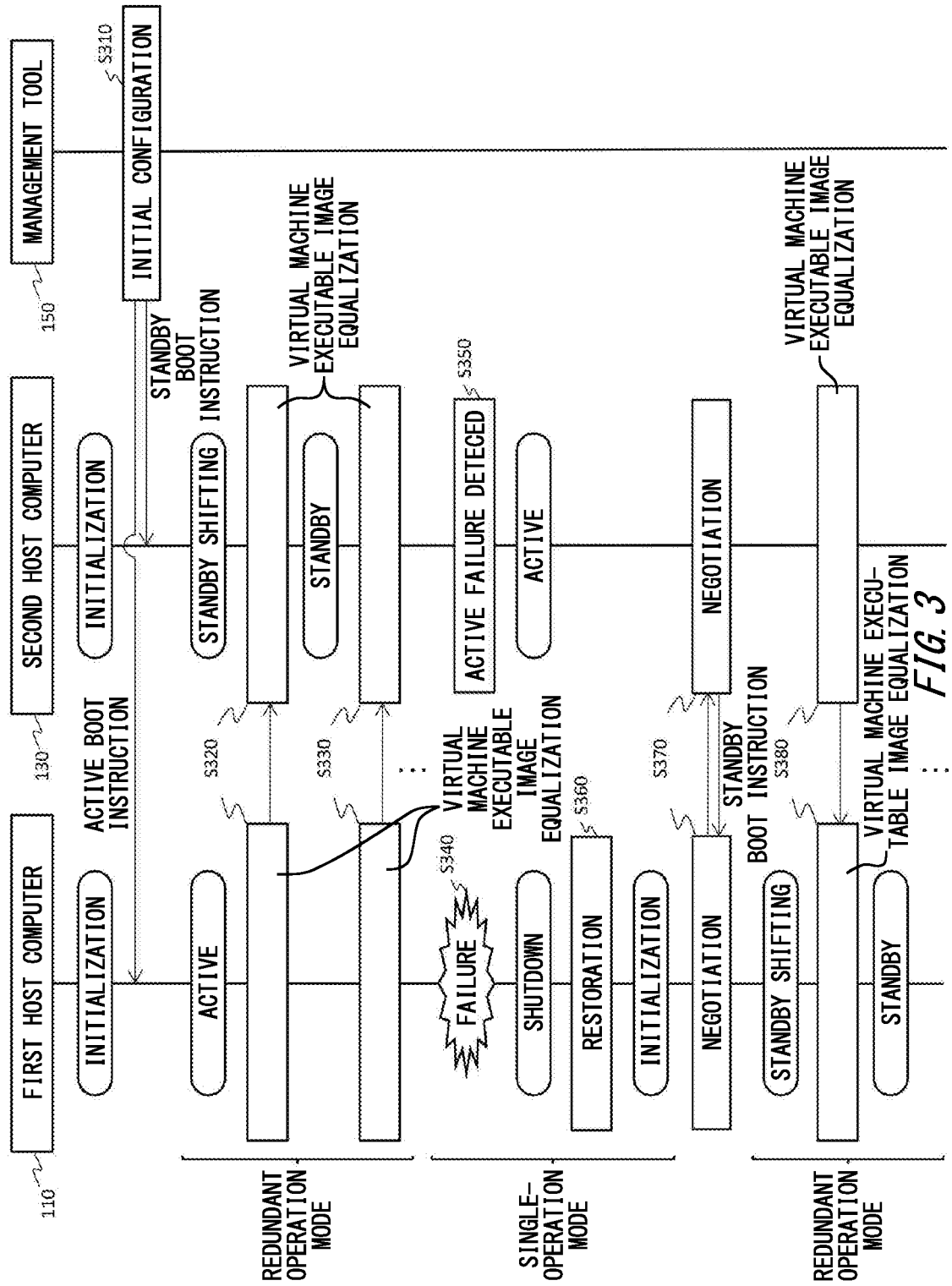
FIG. 3 is a flow showing availability against hardware failure in the system 10 according to the present embodiment.

FIG. 3 is a flow showing availability against hardware failure in the system 10 according to the present embodiment. This figure shows an example in which the first host computer 110 and the second host computer 130 are first put in the active state 210 and the standby state 230, respectively. However, the system 10 may also operate such that the second host computer 130 and the first host computer 110 are first put in the active state 210 and the standby state 230, respectively. In Step 310, the management tool 150 performs initial configuration of the first host computer 110 and the second host computer 130. The management tool 150 outputs an active boot instruction to the first host computer 110. The management tool 150 also outputs a standby boot instruction to the second host computer 130.

After the first host computer 110 receives the active boot instruction, the first platform 114 of the first host computer 110 assigns NetAddr-A to the first guest operating system 122. NetAddr-A is a virtual IP address assigned to a guest operating system executed on a host computer in the active state 210, and is preconfigured by the management tool 150 and prestored on the platform. The client 160 accesses the virtual IP address to receive the provision of various services. In this manner, the first platform 114 causes the first host computer 110 to transition to the active state 210.

After the second host computer 130 receives the standby boot instruction, the second platform 134 of the second host computer 130 stops the execution of the second virtual machine 140, and causes the second host computer 130 to transition to the standby shifting state 220. In this manner, the system 10 operates in the redundant operation mode in which the first host computer 110 is in the active state 210 and the second host computer 130 is in the standby shifting state 220.

In Step 320, in the redundant operation mode, the second host computer 130 mirrors an executable image of the first virtual machine 120 to an executable image of the second virtual machine 140 while stopping the execution of the second virtual machine 140. In the redundant operation mode, the second host computer 130 may copy the executable image of the first virtual machine 120, and mirror the copied executable image of the first virtual machine 120 to the executable image of the second virtual machine 140. More specifically, in the redundant operation mode, the second host computer 130 may perform a live migration on the second platform 134 (by executing the equalization function of the second platform 134) to the first platform 114, to mirror the executable image of the first virtual machine 120 to the executable image of the second virtual machine 140. This will be described in detail below.

In performing the live migration, the first platform 114 first transfers, to the second platform 134, the entire executable image of the first virtual machine 120, indicating the memory content used by the running application, virtual disk information used by the first virtual machine 120, and the like. Next, the first platform 114 transfers, to the second platform 134, only those parts of the executable image of the first virtual machine 120 that are modified during the transfer. Subsequently, the first platform 114 temporarily stops the first virtual machine 120 to temporarily prohibit modifications to the executable image of the first virtual machine 120. The first platform 114 then transfers, to the second platform 134, all the remaining modified parts of the executable image of the first virtual machine 120 while stopping the first virtual machine 120. In this manner, the second platform 134 can copy the executable image of the first virtual machine 120 and mirror it to the executable image of the second virtual machine 140. The first platform 114 then resumes running the first virtual machine 120.

When the equalization of executable images of virtual machines completes, the second platform 134 causes the second host computer 130 to transition to the standby state 230. The system 10 then provides various services to the client 160 from the first application 124 in the redundant operation mode in which the first host computer 110 is in the active state 210 and the second host computer 130 is in the standby state 230 during normal operation. During this process, the second host computer 130 sets the second application 144 as a standby of the first application 124.

In Step 330, the second platform 134 of the second host computer 130 continues mirroring the executable image of the first virtual machine 120 to the executable image of the second virtual machine 140 even while the second application 144 operates as a standby of the first application 124 during normal operation.

Assume that in Step 340, a hardware failure occurs in the first host computer 110 operating in the active state 210.

While the second application 144 is set as a standby of the first application 124, the second host computer 130 continuously diagnoses the health of the first host computer 110 in the active state 210. In Step 350, in response to an abnormality in the execution of the first application 124 occurring while the second application 144 is set as a standby of the first application 124, the second host computer 130 transitions to the active state 210, and starts executing the second virtual machine 140 using the mirrored executable image of the first virtual machine 120. The second host computer 130 then continues to provide the various services to the client 160 using the second application 144. In this process, the entire state of the virtual environment of the first host computer 110 (the environment of the virtual machine and the guest operating system) is handed over to the second host computer 130. Thus, even in this case, the client 160 can receive the continuous provision of services without the need of being aware of the switching of host computers. The system 10 then operates in a single-operation mode with a single host computer (the second host computer 130).

In Step 360, when the first host computer is restored by repairing, self-recovery or the like, the first platform 114 causes the first host computer 110 to transition to the initialization state 200.

In Step 370, the first host computer 110 then negotiates with the second host computer 130 in the active state 210 to determine the boot mode. Specifically, after transitioning to the initialization state 200, the first host computer 110 issues a negotiation request to the second host computer 130 in the active state 210, and when receiving the negotiation request, the second host computer 130 outputs a standby boot instruction to the first host computer 110. When the first host computer 110 receives the standby boot instruction, the first platform 114 of the first host computer 110 causes the first host computer 110 to transition to the standby shifting state 220, and in Step 380, mirrors the executable image of the second virtual machine 140 to the executable image of the first virtual machine 120 in a manner similar to Step 320.

When the equalization of executable images of virtual machines completes, the first platform 114 of the first host computer 110 causes the first host computer 110 to transition to the standby state 230. The system 10 then provides various services to the client 160 from the second application 144 in the redundant operation mode in which the second host computer 130 is in the active state 210 and the first host computer 110 is in the standby state 230. During this process, the first host computer 110 sets the first application 124 as a standby of the second application 144.

Thus, in the system 10 according to the present embodiment, even when a hardware failure or the like occurs in a host computer in the active state 210, a host computer in the standby state 230 transitions to the active state 210 and takes over the virtual environment of the active state 210, so that the services can be continuously provided to the client 160. Moreover, availability against hardware failure can be implemented with a platform that is independent of operating systems and applications, without the use of dedicated systems.

Figure 4:
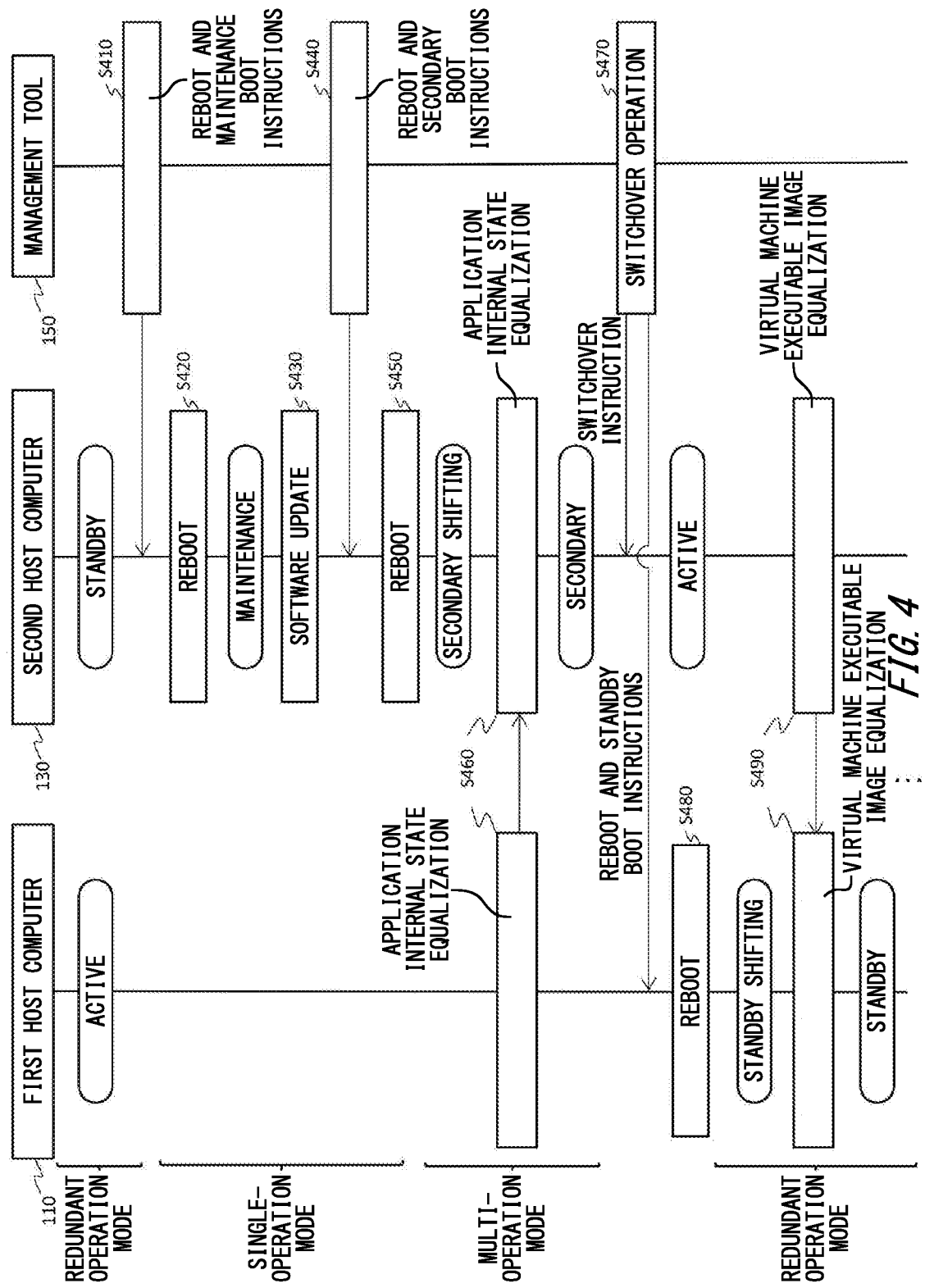
FIG. 4 is a flow showing availability against maintenance in the system 10 according to the present embodiment.

FIG. 4 is a flow showing availability against maintenance in the system 10 according to the present embodiment. This figure illustrates an example in which software (the second guest operating system 142 and the second application 144) running on the second virtual machine 140 is updated in the redundant operation mode in which the first host computer 110 is in the active state 210 and the second host computer 130 is in the standby state 230. The update of software includes updating the revision of the software, applying a security patch, and the like.

In Step 410, when software running on at least one of the first virtual machine 120 and the second virtual machine 140 needs to be updated, the management tool 150 outputs a reboot instruction and a maintenance boot instruction to the second host computer 130 in the standby state 230.

After the second host computer 130 receives the reboot instruction and the maintenance boot instruction, in Step 420, the second platform 134 of the second host computer 130 causes the second host computer 130 to reboot and transition to the maintenance state 260.

In step 430, the second host computer 130 then updates software running on the second virtual machine 140.

When the update of the software in the second host computer 130 is finished, in Step 440, the management tool 150 outputs a reboot instruction and a secondary boot instruction to the second host computer 130.

After the second host computer 130 receives the reboot instruction and the secondary boot instruction, in Step 450, the second platform 134 of the second host computer 130 causes the second host computer 130 to reboot. Also, the second platform 134 assigns both of NetAddr-A and NetAddr-S to the second guest operating system 142, and disables NetAddr-A, to cause the second host computer 130 to transition to the secondary shifting state 240. NetAddr-S is a virtual IP address assigned to a guest operating system executed on a host computer in the secondary state 250, and is different from the virtual IP address assigned to a guest operating system executed on a host computer in the active state 210. NetAddr-S is preconfigured by the management tool 150 and prestored on the platform, similar to NetAddr-A. In this manner, the system 10 operates in the multi-operation mode in which the first host computer 110 is in the active state 210 and the second host computer 130 is in the secondary shifting state 240. In this state, the second virtual machine 140 is executed in parallel with the first virtual machine 120.

In Step 460, in the multi-operation mode, the second host computer 130 then mirrors the internal state of the first application 124 to the internal state of the second application 144 while executing the second virtual machine 140 in parallel with the first virtual machine. The first application 124 and the second application 144 have an application equalization function. The application equalization function is a function of taking over control data of an application program and mirroring the operational state of the application as previously running to another application. In the multi-operation mode, the second host computer 130 may mirror the internal state of the first application 124 to the internal state of the second application 144 on the second application 144 (by executing the equalization function of the second application 144). Alternatively, as will be described later, in the multi-operation mode, the second host computer 130 may mirror the internal state of the first application 124 to the internal state of the second application 144 on the second platform 134 (by executing the equalization function of the second platform 134).

When the equalization of internal states of applications completes, the second application 144 notifies the second platform 134 of the completion of the equalization of internal states. The second platform 134 then causes the second host computer 130 to transition to the secondary state 250.

Next, in Step 470, the management tool 150 performs a switchover operation by outputting a switchover instruction to the second host computer 130 and outputting a reboot instruction and a standby boot instruction to the first host computer 110.

After the second host computer 130 receives the switchover instruction, the second platform 134 of the second host computer 130 deletes NetAddr-S from the network configuration of the second guest operating system, and enables NetAddr-A, to cause the second host computer 130 to transition to the active state 210. In this case, although the client 160 is temporarily disconnected from the communication with the first host computer 110 previously in the active state 210 due to the switchover operation, the second host computer 130 previously in the secondary state 250 is switched to the active state 210 and the communication connection is restored, so that the client 160 can receive continuous services from the system 10.

After the first host computer 110 receives the reboot instruction and the standby boot instruction, the first platform 114 of first host computer 110 causes the first host computer 110 to reboot and transition to the standby shifting state 220.

In Step 490, the first platform 114 then mirrors the executable image of the second virtual machine 140 to the executable image of the first virtual machine 120 in a manner similar to Step 320 and Step 380.

When the equalization of executable images of virtual machines completes, the first platform 114 of the first host computer 110 causes the first host computer 110 to transition to the standby state 230. The system 10 then provides various services to the client 160 from the second application 144 in the redundant operation mode in which the second host computer 130 is in the active state 210 and the first host computer 110 is in the standby state 230. During this process, the first host computer 110 sets the first application 124 as a standby of the second application 144. In this process, the software copied to the first host computer 110 side is already updated on the second host computer 130 side, and there is no need to perform a software update operation on the first host computer 110 side.

Thus, in the system 10 according to the present embodiment, in the redundant operation mode, in response to receiving an instruction to update software running on at least one of the first virtual machine 120 and the second virtual machine 140 while the second application 144 operates as a standby of the first application 124, the second host computer 130 updates software running on the second virtual machine 140, and after updating the software, transitions to the multi-operation mode, and mirrors the internal state of the first application 124 to the internal state of the second application 144. After the second host computer 130 mirrors the internal state of the first application 124 to the internal state of the second application 144, in the redundant operation mode, the first host computer 110 sets the first application 124 as a standby of the second application 144, and mirrors the executable image of the second virtual machine 140 to the executable image of the first virtual machine 120. In this manner, in the system 10 according to the present embodiment, even if software needs to be updated, services can be continuously provided to the client 160. Moreover, in the system 10 according to the present embodiment, availability against software update can be implemented with a platform that is independent of operating systems and applications, without the use of dedicated systems. Furthermore, in the system 10 according to the present embodiment, the software update operation is only required to be performed on one host computer, so that the time for the maintenance work can be reduced, and the serviceability can be greatly improved.

Figure 5:
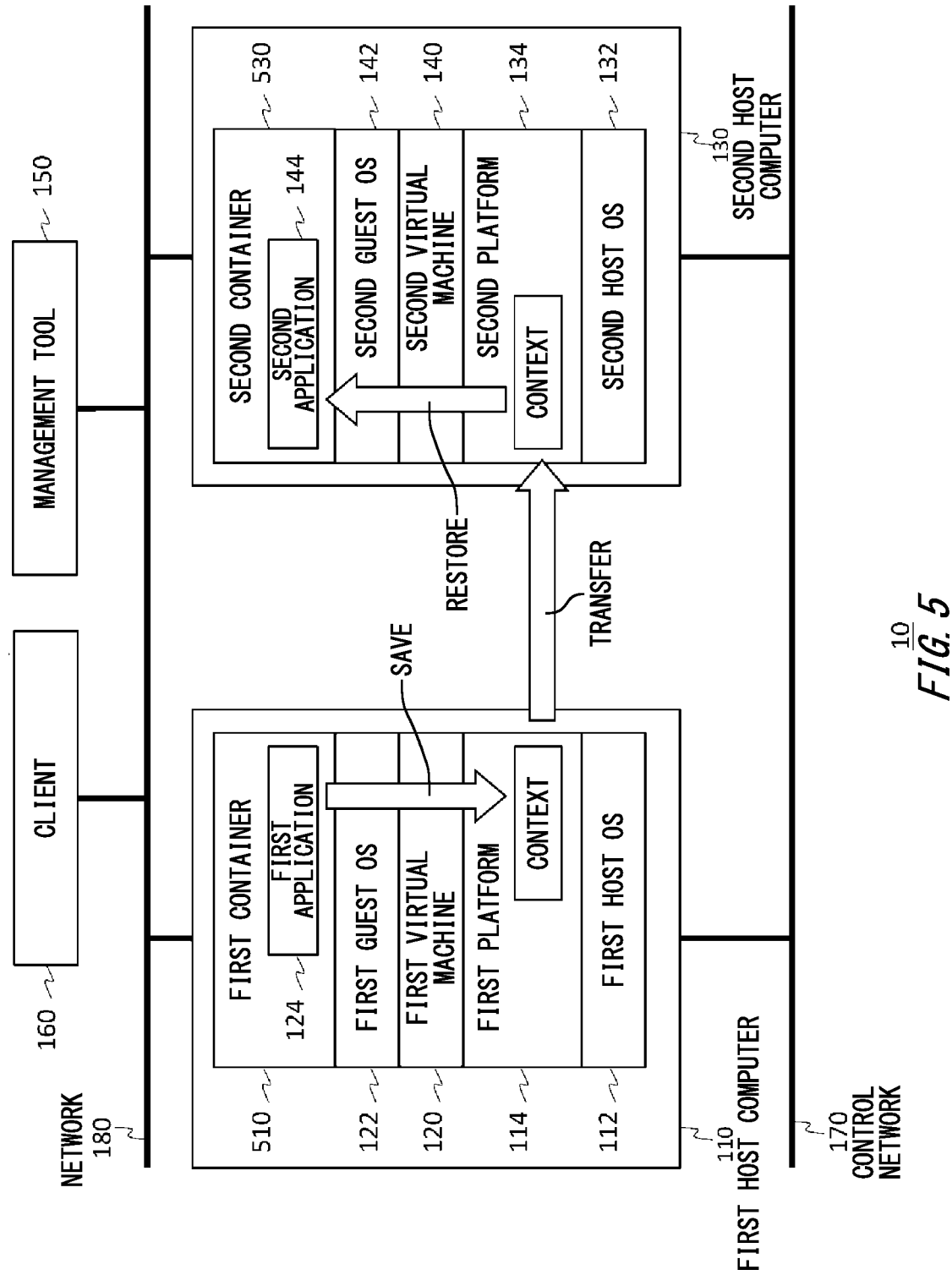
FIG. 5 shows a system 10 according to a modified example of the present embodiment.

FIG. 5 shows a system 10 according to a modified example of the present embodiment. In FIG. 5, those elements that have the same function and configuration as those in FIG. 1 are provided with the same reference numerals, and will not be repeatedly described below except for some differences. This figure is different from FIG. 1 in that the first application 124 runs on a first container 510 and the second application 144 runs on a second container 530.

Containers provide separated spaces for applications. By implementing separated spaces for applications using the containers, processes can be separated even in a single operating system environment. The contents of the containers can be packaged, saved, and moved. In the modified example, the first container 510 has a function to save and restore the entire context of the first application 124. Also, the second container 530 has a function to save and restore the entire context of the second application 144. After saving the context of an application of a host computer operating in the active state 210, the system 10 restores the context image in an application of a host computer operating in the secondary state 250.

The following describes an example in which the modified example is applied to the equalization of internal states of applications (Step 460 in FIG. 4, for example) in the multi-operation mode in which the first host computer 110 is in the active state 210 and the second host computer 130 is in the secondary state 250.

As above, in the system 10 according to the modified example, the first host computer 110 saves the context of the first application 124 from the first application 124 to the first platform 114. Next, the context of the first application 124 is transferred from the first platform 114 to the second platform 134. The second host computer 130 then restores the transferred context of the first application 124 from the second platform 134 to the second application 144. In this manner, in the system 10 according to the modified example, the first application 124 and the second application 144 do not need to have a function to equalize their internal states. Moreover, the internal state of an application can easily be copied from a host computer in the active state 210 to a host computer in the secondary state 250 without any discrepancy. Thus, in the system 10 according to the modified example, availability against hardware failure and availability against maintenance can be implemented with a platform that is completely independent of applications.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (RTM) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA, C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 6:
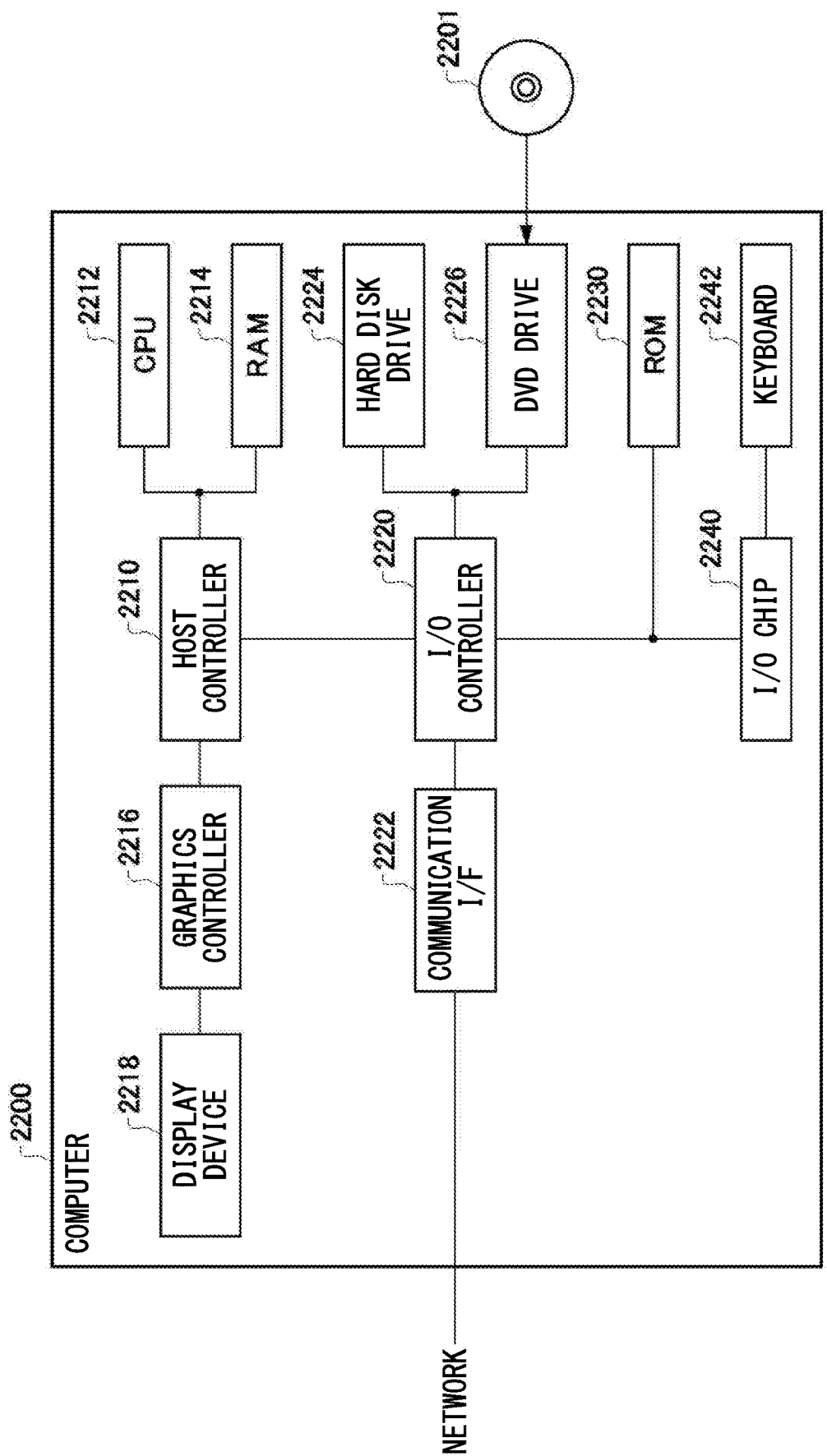
FIG. 6 shows an example of a computer 2200 in which aspects of the present invention may be wholly or partly embodied.

FIG. 6 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A system comprising:
a first host computer to execute a first virtual machine for running a first application; and
a second host computer to execute a second virtual machine for running a second application, wherein
in a redundant operation mode of the system, the second host computer mirrors an executable image of the first virtual machine to an executable image of the second virtual machine while stopping the execution of the second virtual machine, and
in a multi-operation mode of the system, the second host computer mirrors an internal state of the first application to an internal state of the second application while executing the second virtual machine in parallel with the first virtual machine;
wherein
in the redundant operation mode of the system, in response to receiving an instruction to update software running on at least one of the first virtual machine and the second virtual machine while the second application is set as a standby of the first application, the second host computer updates software running on the second virtual machine, and
after updating the software, the second host computer transitions to the multi-operation mode of the system, and mirrors the internal state of the first application to the internal state of the second application.

2. The system according to claim 1, wherein in the redundant operation mode of the system, the second host computer copies the executable image of the first virtual machine, and mirrors the copied executable image of the first virtual machine to the executable image of the second virtual machine.

3. The system according to claim 1, wherein
the first host computer executes a first platform comprising a virtualized environment in which to execute the first virtual machine,
the second host computer executes a second platform comprising a virtualized environment in which to execute the second virtual machine, and
in the redundant operation mode of the system, the second host computer mirrors the executable image of the first virtual machine to the executable image of the second virtual machine on the second platform.

4. The system according to claim 1, wherein in the multi-operation mode of the system, the second host computer mirrors the internal state of the first application to the internal state of the second application on the second application.

5. The system according to claim 3, wherein in the multi-operation mode of the system, the second host computer mirrors the internal state of the first application to the internal state of the second application on the second platform.

6. The system according to claim 5, wherein
the first host computer saves a context of the first application from the first application to the first platform, and transfers the context of the first application from the first platform to the second platform, and
the second host computer restores the transferred context of the first application from the second platform to the second application.

7. The system according to claim 1, wherein in the redundant operation mode of the system, in response to an abnormality in execution of the first application occurring while the second application is set as a standby of the first application, the second host computer starts executing the second virtual machine using the mirrored executable image of the first virtual machine.

8. The system according to claim 1, wherein after the second host computer mirrors the internal state of the first application to the internal state of the second application, in the redundant operation mode of the system, the first host computer sets the first application as a standby of the second application, and mirrors the executable image of the second virtual machine to the executable image of the first virtual machine.

9. The system according to claim 1, wherein
in the redundant operation mode of the system, only one of an operating system executing the first application on the first virtual machine and an operating system executing the second application on the second virtual machine is assigned a network configuration that is externally accessible, and
in the multi-operation mode of the system, the operating system executing the first application on the first virtual machine and the operating system executing the second application on the second virtual machine are assigned respective, different network configurations that are externally accessible.

10. A method in a system comprising a first host computer to execute a first virtual machine for running a first application and a second host computer to execute a second virtual machine for running a second application, the method comprising:
in a redundant operation mode of the system, the second host computer mirroring an executable image of the first virtual machine to an executable image of the second virtual machine while stopping the execution of the second virtual machine, and
in a multi-operation mode of the system, the second host computer mirroring an internal state of the first application to an internal state of the second application while executing the second virtual machine in parallel with the first virtual machine;
wherein
in the redundant operation mode of the system, in response to receiving an instruction to update software running on at least one of the first virtual machine and the second virtual machine while the second application is set as a standby of the first application, the second host computer updates software running on the second virtual machine, and
after updating the software, the second host computer transitions to the multi-operation mode of the system, and mirrors the internal state of the first application to the internal state of the second application.

11. A non-transitory program-recording medium in a system comprising a first host computer to execute a first virtual machine for running a first application and a second host computer to execute a second virtual machine for running a second application, the program-recording medium having recorded thereon a program that, when executed by the second host computer, causes the second host computer to:
in a redundant operation mode of the system, mirror an executable image of the first virtual machine to an executable image of the second virtual machine while stopping the execution of the second virtual machine, and
in a multi-operation mode of the system, mirror an internal state of the first application to an internal state of the second application while executing the second virtual machine in parallel with the first virtual machine;
wherein
in the redundant operation mode of the system, in response to receiving an instruction to update software running on at least one of the first virtual machine and the second virtual machine while the second application is set as a standby of the first application, the second host computer updates software running on the second virtual machine, and
after updating the software, the second host computer transitions to the multi-operation mode of the system, and mirrors the internal state of the first application to the internal state of the second application.

* * * * *